(12) United States Patent
Okamoto et al.

(10) Patent No.: US 11,174,807 B2
(45) Date of Patent: Nov. 16, 2021

(54) OPERATION CONTROL METHOD OF VEHICLE ENGINE AND VEHICLE SYSTEM

(71) Applicant: NGK INSULATORS, LTD., Nagoya (JP)

(72) Inventors: Taku Okamoto, Nagoya (JP); Osamu Nakasone, Inabe (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 16/986,319

(22) Filed: Aug. 6, 2020

(65) Prior Publication Data

US 2021/0054796 A1 Feb. 25, 2021

(30) Foreign Application Priority Data

Aug. 19, 2019 (JP) .............................. JP2019-149864

(51) Int. Cl.
 *F02D 41/14* (2006.01)
 *G01N 27/407* (2006.01)
 *G01N 27/41* (2006.01)

(52) U.S. Cl.
 CPC ..... *F02D 41/1475* (2013.01); *G01N 27/4073* (2013.01); *G01N 27/41* (2013.01); *F02D 41/1454* (2013.01); *F02D 41/1463* (2013.01)

(58) Field of Classification Search
 CPC ............. F02D 41/1475; F02D 41/1454; F02D 41/1463; F02D 2041/1468; G01N 27/4073; G01N 27/41
 See application file for complete search history.

(56) References Cited

U.S. PATENT DOCUMENTS

| 6,348,141 B1* | 2/2002 | Kato | G01N 27/4077 |
| | | | 204/426 |
| 2009/0165440 A1* | 7/2009 | Sawada | B01D 53/9495 |
| | | | 60/276 |
| 2009/0229356 A1* | 9/2009 | Kariya | G01M 15/104 |
| | | | 73/114.73 |

(Continued)

FOREIGN PATENT DOCUMENTS

| JP | 2008057404 A | * | 3/2008 | ......... F02D 41/1463 |
| JP | 2018-178761 A | | 11/2018 | |
| JP | 2018-178762 A | | 11/2018 | |

OTHER PUBLICATIONS

Go Hayashita, et al., New Exhaust Emission Control System with Two A/F Sensors, SAE Technical Paper 2017-01-0917, Published Mar. 28, 2017.

*Primary Examiner* — Joseph J Dallo
(74) *Attorney, Agent, or Firm* — Mattingly & Malur, PC (57) ABSTRACT

In a method of performing active control between a lean operation state and a rich operation state on a vehicle engine including a three way catalyst in an exhaust path, on a downstream side with respect to the three way catalyst in the exhaust path, a limited current type NOx sensor having $NH_3$ interference and also capable of detecting a change in an oxygen concentration on the downstream side is disposed, and an operation state of the vehicle engine is switched between a lean operation state and a rich operation state at a timing when a detection of a change in an oxygen concentration in an exhaust air flowing out from the three way catalyst or a detection of NOx or $NH_3$ is performed first by the NOx sensor.

8 Claims, 6 Drawing Sheets

(56) References Cited

U.S. PATENT DOCUMENTS

| | | | |
|---|---|---|---|
| 2011/0138874 A1* | 6/2011 | Murase | F02D 41/2474 |
| | | | 73/1.06 |
| 2011/0202230 A1* | 8/2011 | Sawada | F02D 41/146 |
| | | | 701/29.2 |
| 2016/0223488 A1* | 8/2016 | Kayama | G01N 27/41 |
| 2016/0290961 A1* | 10/2016 | Aoki | G01N 27/4074 |
| 2017/0009695 A1* | 1/2017 | Hashida | F02D 41/263 |
| 2018/0094564 A1* | 4/2018 | Okamoto | G01N 27/4067 |
| 2018/0179979 A1* | 6/2018 | Miyamoto | G01N 27/4073 |
| 2018/0283302 A1 | 10/2018 | Hayashita et al. | |
| 2018/0283304 A1 | 10/2018 | Yoda et al. | |

* cited by examiner

OPERATION CONTROL METHOD OF VEHICLE ENGINE AND VEHICLE SYSTEM

CROSS-REFERENCE TO RELATED APPLICATION

The present application claims priority from Japanese application JP2019-149864, filed on Aug. 19, 2019, the contents of which is hereby incorporated by reference into this application.

BACKGROUND OF THE INVENTION

Field of the Invention

The present invention relates to an operation control of an engine mounted in a vehicle, and more particularly to control based on an atmosphere in a downstream of a catalyst provided in an exhaust path of the engine.

Description of the Background Art

A gasoline engine mounted in a vehicle (typically, an automobile) emits an exhaust gas containing toxic substances, namely, nitrogen oxide (NOx), total hydrocarbon (THC), and carbon monoxide (CO), at the time of operation of the gasoline engine. These types of gas are subject to a discharge regulation, and therefore, in many gasoline engine vehicles, a catalyst that collectively removes these three contained substances (purifies an exhaust gas), i.e., a three way catalyst (TWC), is mounted.

The three way catalyst includes a part made of precious metal, such as palladium (Pd), platinum (Pt), and rhodium (Rh), and a part made of ceramics mainly containing ceria ($CeO_2$). The part made of precious metal causes main catalytic action. The part made of ceramics serves as a promoter. Pd and Pt have a function of oxidizing HC and CO in an exhaust gas to generate carbon dioxide ($CO_2$) and water ($H_2O$). Further, Pd and Rh have a function of reducing NOx in an exhaust gas to generate nitrogen ($N_2$). Ceria has a function of causing absorption and elimination of oxygen ($O_2$). In the TWC, when HC and CO are oxidized, necessary oxygen is released from ceria, and when NOx is reduced, generated oxygen is absorbed into (stored in) ceria.

A gasoline engine is mainly operated with reference to a stoichiometric state in which its air-fuel ratio (A/F) is equal to a stoichiometric air-fuel ratio or has a value close to a stoichiometric air-fuel ratio and fuel introduced into an engine cylinder is completely burned, however, depending on a condition of a vehicle, operation is performed with an operation state appropriately transitioned also to a lean state in which A/F is higher than a stoichiometric state or to a rich state in which A/F is lower than a stoichiometric state. In the stoichiometric state out of these states, a TWC can remove all HC, CO, and NOx at a high removal rate.

More specifically, a removal rate of a TWC with regard to NOx is relatively high during rich operation (in a reduced atmosphere) and during stoichiometric operation, and is relatively low during lean operation (in an atmosphere with excessive oxygen). Conversely, a removal rate of a TWC with regard to HC and CO is relatively high during lean operation and during stoichiometric operation, and is relatively low during rich operation. This is because, during rich operation, an oxygen content in an exhaust gas is low and therefore NOx can be easily reduced, whereas, during lean operation, an oxygen content in an exhaust gas is high and therefore HC and CO can be easily oxidized.

In other words, there is a tendency that HC and CO are easily emitted from the TWC purifying the exhausted gas in rich operation, while NOx is easily emitted from the TWC purifying the exhausted gas in lean operation. $NH_3$ which is not emitted from a gasoline engine itself is also emitted from the former TWC.

There is a configuration, as feedback control of air-fuel ratio in a vehicle in which a gasoline engine is mounted, that an air-fuel ratio (A/F) sensor is provided on an upstream side with respect to a TWC in an exhaust path of an engine, an oxygen sensor (binary sensor) is provided on a downstream side, and in a case where the air-fuel ratio of the exhaust air of the engine is in a rich state, a state of the engine is changed to a lean operation state at a timing when the binary sensor detects a rich atmosphere (when an oxygen concentration corresponding to the rich atmosphere is output), and then the state of the engine is changed to a rich operation state at a timing when the binary sensor detects a lean atmosphere (when an oxygen concentration corresponding to the lean atmosphere is output) (for example, refer to Go Hayashita, Motoki Ohtani, Keiichiro Aoki, and Shuntaro Okazaki, "New Exhaust Emission Control System with Two A/F Sensors", SAE Technical Paper, 2017-01-0917, 2017).

In the meanwhile, also already known is a dealing that a limited current type NOx sensor made up of an oxygen ion conductive solid electrolyte is provided on a downstream side of a catalyst, and when the NOx sensor detects $NH_3$, the operation state of the engine is changed to suppress an emission of HC and CO which are restricted substances, which uses the fact that the NOx sensor has $NH_3$ interference (for example, refer to Japanese Patent Application Laid-Open Nos. 2018-178761 and 2018-178762).

The method disclosed in Japanese Patent Application Laid-Open Nos. 2018-178761 and 2018-178762 uses characteristics that a speed of occurrence of $NH_3$ is faster than a change of speed of air-fuel ratio on the downstream side of the TWC.

However, found out after an earnest review by the inventors of the present invention is a case which does not necessarily fall under the characteristics described above.

SUMMARY

The present invention is directed to operation control of an engine mounted in a vehicle, and more particularly to control based on an atmosphere in a downstream of a catalyst provided in an exhaust path of the engine.

According to the present invention, a method of performing active control between a lean operation state and a rich operation state on a vehicle engine including a three way catalyst in an exhaust path includes steps of: a) locating, on a downstream side with respect to the three way catalyst in the exhaust path, a limited current type NOx sensor having $NH_3$ interference and also capable of detecting a change in an oxygen concentration on the downstream side; and b) switching an operation state of the vehicle engine between a lean operation state and a rich operation state at a timing when a detection of a change in an oxygen concentration in an exhaust air flowing out from the three way catalyst or a detection of NOx or $NH_3$ is performed first by the NOx sensor.

According to the above invention, a deterioration of an emission from the three way catalyst to the downstream side is preferably suppressed regardless of an amount of flow of the exhaust air from the three way catalyst.

Accordingly, the object of the present invention is to provide an operation control method of a vehicle engine and a vehicle system capable of suppressing an emission from a TWC more preferably than ever before.

These and other objects, features, aspects and advantages of the present invention will become more apparent from the following detailed description of the present invention when taken in conjunction with the accompanying drawings.

DESCRIPTION OF THE PREFERRED EMBODIMENTS

<Configuration of System>

Figure 1:
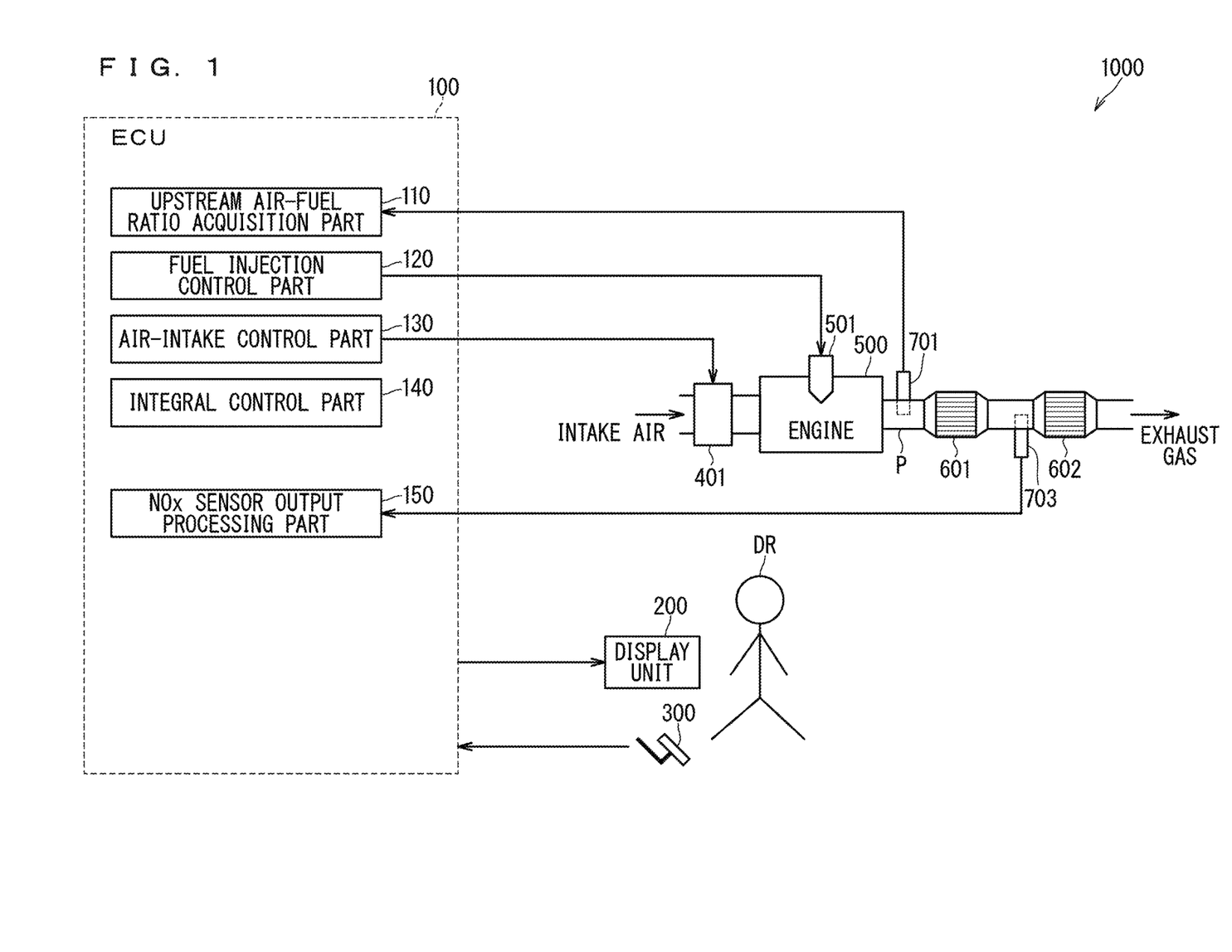
FIG. 1 is a diagram schematically illustrating a configuration of a vehicle.

FIG. 1 is a drawing schematically illustrating a configuration of a vehicle (system) 1000 according to the present embodiment. In present embodiment, the vehicle 1000 is an automobile driven by a driver DR.

The vehicle 1000 mainly includes a gasoline engine (hereinafter simply referred to as an engine) 500 that is a type of an internal combustion engine and serves as a source of power, a fuel injection device 501 that injects fuel into the inside (combustion chamber) of the engine 500, an air-intake unit 401 that supplies air to the engine 500, a three way catalyst (TWC) 601 that purifies an exhaust gas emitted from the engine 500, an electronic control device (ECU) 100 that controls operation of each unit of the vehicle 1000, a display unit 200 such as an instrument panel for presenting the driver DR with various pieces of information related to the vehicle 1000, and an accelerator pedal 300 that is one of various operation units operated by the driver DR when the driver DR operates the vehicle 1000. Note that other examples of the operation units include a steering wheel, a shift lever (selector) for a transmission, and a brake pedal (none of which is shown).

The air-intake unit 401 and the TWC 601 are connected to the engine 500 with respective pipes P. A path for a gas from the air-intake unit 401 to the engine 500 is hereinafter referred to as a supply side or an air-intake path, whereas a path for a gas from the engine 500 to the TWC 601 is referred to as an exhaust side or an exhaust path. Further, a side on the engine 500 with respect to the TWC 601 is referred to as an upstream side, whereas a side on the opposite side of the engine 500 with respect to the TWC 601 is referred to as a downstream side, based on a flow of an exhaust gas in which an exhaust gas is emitted from the engine 500, introduced into the TWC 601, and is further emitted from the TWC 601.

To give a brief description, power is generated in the vehicle 1000 in the following manner: an air-fuel mixture, which is a mixture of air (intake air) taken from the outside through the air-intake unit 401 and fuel injected from the fuel injection device 501, is compressed in the engine 500; the compressed air-fuel mixture is ignited with a spark plug (not shown); the ignition causes the compressed air-fuel mixture to be exploded and burned, and to be expanded; pressure generated at this time moves a piston (not shown), thus generating power. Then, a gas generated through such power generation is emitted as an exhaust gas to the exhaust path, such that the exhaust gas is purified by the TWC 601.

The exhaust gas contains toxic substances, namely, nitrogen oxide (NOx), total hydrocarbon (THC), and carbon monoxide (CO). The TWC 601 is capable of collectively removing these three contained substances (purifying an exhaust gas) at respective high removal rates.

The TWC 601 includes a part made of precious metal, such as palladium (Pd), platinum (Pt), and rhodium (Rh), and a part made of ceramics mainly containing ceria ($CeO_2$). The part made of precious metal causes main catalytic action. The part made of ceramics serves as a promoter. Pd and Pt have a function of oxidizing HC and CO in an exhaust gas to generate carbon dioxide ($CO_2$) and water ($H_2O$). Pd and Rh have a function of reducing NOx in an exhaust gas to generate nitrogen ($N_2$). Ceria has a function of causing absorption and elimination of oxygen ($O_2$). In the TWC 601, when HC and CO are oxidized, necessary oxygen is released from ceria, and when NOx is reduced, generated oxygen is absorbed into (stored in) ceria.

In the present embodiment, the TWC 601 in a normal state without deterioration is capable of the following function: when the engine 500 is in a stoichiometric state (state in which an air-fuel ratio of an exhaust gas has a stoichiometric value (approximately 14.7)) or a rich state (state in which an air-fuel ratio of an exhaust gas has a value smaller than the stoichiometric value), the TWC 601 removes NOx at a high removal rate of 90% or more (reduces NOx to $N_2$); when the engine 500 is in a stoichiometric state or a lean state (state in which an air-fuel ratio of an exhaust gas has a value larger than the stoichiometric value), the TWC 601 removes HC and CO at a high removal rate of 90% or more (oxidizes HC and CO to $H_2O$ and $CO_2$, respectively).

The vehicle 1000 further includes an upstream air-fuel ratio detection means 701 and an NOx sensor 703. The upstream air-fuel ratio detection means 701 is provided on the pipe P connecting the engine 500 and the TWC 601 on an upstream side with respect to the TWC 601. The NOx sensor 703 is provided on the pipe P located on a downstream side with respect to the TWC 601.

The upstream air-fuel ratio detection means 701 is disposed to measure an air-fuel ratio of an exhaust gas on an upstream side and a downstream side of the TWC 601. The NOx sensor 703 is disposed to measure NOx concentration in an exhaust gas on a downstream side of the TWC 601. Outputs from these detection means are used for the purpose of driving control of the vehicle 1000.

The ECU 100 includes an electronic circuit including at least one integrated circuit (IC). The electronic circuit includes at least one processor (not shown). Each function of the ECU 100 can be implemented by the processor executing software. The software is described as a program, and is stored in memory (not shown). The memory for storing the program may be included in the ECU 100. For example, the memory is non-volatile or volatile semiconductor memory.

The ECU 100 includes mainly, as its functional components, an upstream air-fuel ratio acquisition part 110, a fuel injection control part 120, an air-intake control part 130, an integral control part 140, and an NOx sensor output acquisition part 150.

The upstream air-fuel ratio acquisition part 110 acquires an air-fuel ratio signal from the upstream air-fuel ratio detection means 701. The air-fuel ratio signal needs not necessarily be acquired as an air-fuel ratio itself, and may be acquired as a voltage value or a current value according to the air-fuel ratio.

Note that an air-fuel ratio on an upstream side of the TWC 601 determined based on a detection result obtained by the upstream air-fuel ratio detection means 701 is hereinafter referred to as upstream A/F. An air-fuel ratio on a downstream side of the TWC 601 is referred to as downstream A/F.

The fuel injection control part 120 controls injection of fuel from the fuel injection device 501, in accordance with a control command from the integral control part 140 according to an operation state of the accelerator pedal 300 operated by the driver DR, for example.

The air-intake control part 130 controls intake of air from the air-intake unit 401, in accordance with a control command from the integral control part 140 according to an operation state of the accelerator pedal 300 operated by the driver DR, for example.

The integral control part 140 integrally controls overall operation of the vehicle 1000 through giving a control command to each controller of the ECU 100, according to a state of operation performed by the driver DR on operation units such as the accelerator pedal 300.

The NOx sensor output acquisition part 150 acquires various signal values being output from the NOx sensor 703. Examples of the signal value include a binary output value described hereinafter and an NOx sensor output value corresponding to an NOx concentration in the measurement gas (an NOx current value or an NOx concentration value).

In the vehicle 1000, an additional catalyst 602 may be provided on a further downstream side of the NOx sensor 703. For example, the additional catalyst 602 is another TWC, a gasoline particulate filter (GPF), or a selective catalytic reduction (SCR) catalyst. In this case, an exhaust gas from the engine 500 is more preferably purified.

<Outline of NOx Sensor>

Figure 2:
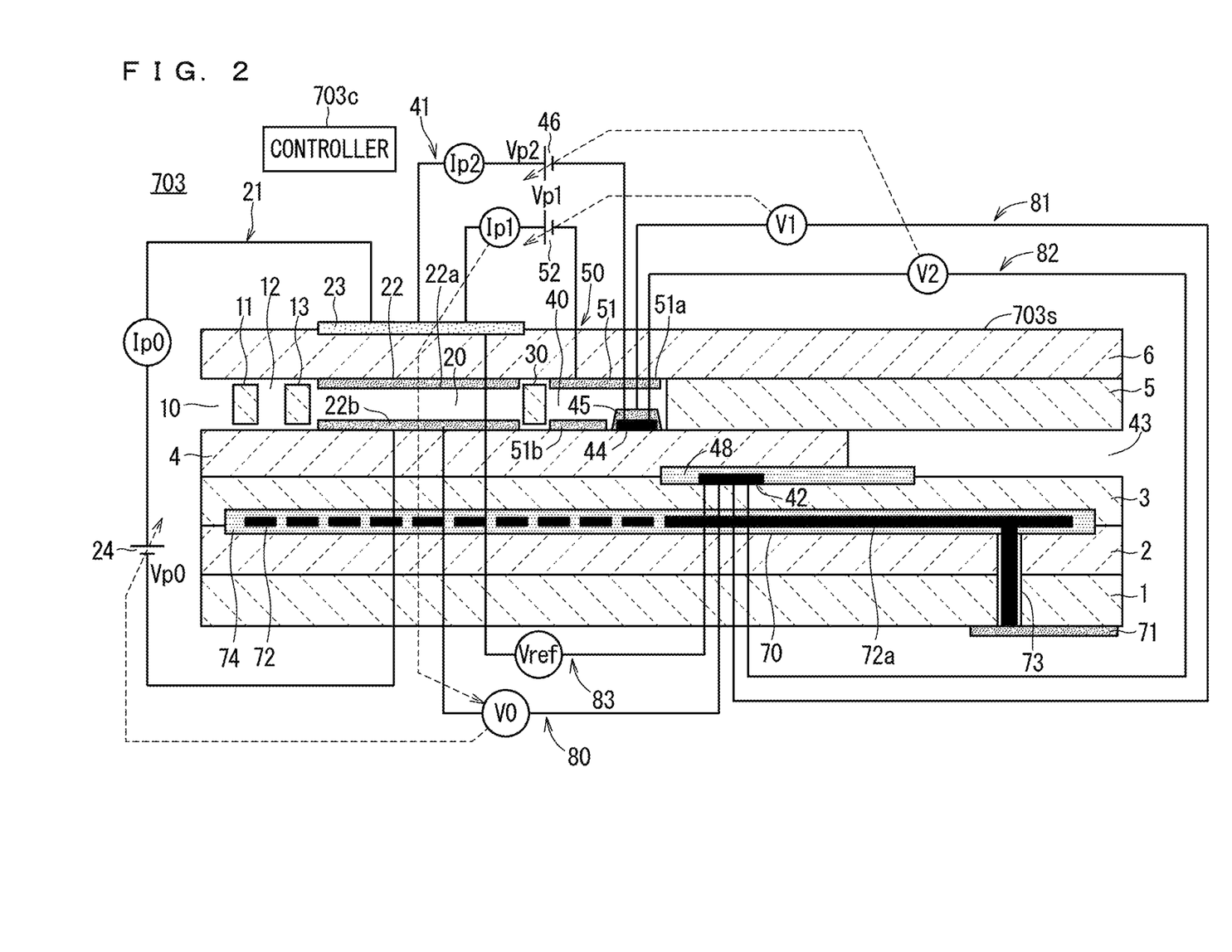
FIG. 2 is a drawing schematically illustrating an example of a configuration of an NOx sensor.

A schematic configuration of the NOx sensor 703 is described next. FIG. 2 is a drawing schematically illustrating an example of a configuration of the NOx sensor 703 including a vertical cross-sectional view along a longitudinal direction of a sensor element 703s. In the present embodiment, the NOx sensor 703 is a limited current type sensor detecting NOx using the sensor element 703s to measure concentration thereof. The NOx sensor 703 further includes a controller 703c controlling operation of each part and specifying the NOx concentration based on the NOx current flowing in the sensor element 703s. A known NOx sensor is applicable to the NOx sensor 703.

The sensor element 703s is a flat plate-like (elongated plate-like) element having a structure made up of six solid electrolyte layers of a first substrate layer 1, a second substrate layer 2, a third substrate layer 3, a first solid electrolyte layer 4, a spacer layer 5, and a second solid electrolyte layer 6, each of which is made of an oxygen ion conductive solid electrolyte, namely zirconia ($ZrO_2$) (for example, made of yttria-stabilized zirconia (YSZ)), stacked in this order from a lower side when seeing the drawings. The solid electrolyte forming these six layers is dense and airtight. A surface on an upper side of each of the six layers in FIG. 2 is simply referred to as an upper surface, and a surface on a lower side thereof is simply referred to as a lower surface in some cases hereinafter. A whole part of the sensor element 703s made up of the solid electrolyte is collectively referred to as a base part.

The sensor element 703s is manufactured by performing predetermined processing and printing a circuit pattern on a ceramic green sheet corresponding to each layer, then laminating the green sheets, and further firing to integrate them with each other, for example.

A gas inlet 10, a first diffusion control part 11, a buffer space 12, a second diffusion control part 13, a first inner space 20, a third diffusion control part 30, and a second inner space 40 are adjacently formed to be communicated with each other in this order between a lower surface of the second solid electrolyte layer 6 and an upper surface of the first solid electrolyte layer 4 in a leading end of the sensor element 703s.

The gas inlet 10, the buffer space 12, the first inner space 20, and the second inner space 40 are spaces in the sensor element 703s that look as if they were provided by hollowing out the spacer layer 5, an upper part thereof defined by the lower surface of the second solid electrolyte layer 6, a lower part thereof defined by the upper surface of the first solid electrolyte layer 4, and a side part thereof defined by the side surface of the spacer layer 5.

Each of the first diffusion control part 11, the second diffusion control part 13, and the third diffusion control part 30 is provided as two horizontally long slits (with an opening having a longitudinal direction perpendicular to the drawing sheet of FIG. 2). A region from the gas inlet 10 to the second inner space 40 is also referred to as a gas distribution part.

A reference gas introduction space 43 is provided in a position farther away from the leading end side in relation to the gas introduction part between the upper surface of the third substrate layer 3 and the lower surface of the spacer layer 5, a side part thereof defined by a side surface of the first solid electrolyte layer 4. Atmospheric air, for example, is introduced into the reference gas introduction space 43 as a reference gas in measuring the NOx concentration.

An atmospheric air introduction layer 48 is a layer formed of porous alumina, and the reference gas is introduced into the atmospheric air introduction layer 48 through the reference gas introduction space 43. The atmospheric air introduction layer 48 is formed to cover a reference electrode 42.

The reference electrode 42 is an electrode having a configuration of being sandwiched between the upper surface of the third substrate layer 3 and the first solid electrolyte layer 4, and the atmospheric air introduction layer 48 leading to the reference gas introduction space 43 is provided around the reference electrode 42 as described above.

The gas inlet 10 is a portion having an opening to an outer space in the gas introduction part, and the measurement gas is taken into the sensor element 703s from the outer space through the gas inlet 10.

The first diffusion control part 11 is a portion for providing the measurement gas taken from the gas inlet 10 of the predetermined diffusion resistance.

The buffer space 12 is a space provided for leading the measurement gas, which is introduced from the first diffusion control part 11, to the second diffusion control part 13. The buffer space 12 is provided so that a pulsation of an exhaust gas pressure does not influence the measurement in the NOx sensor 703.

The second diffusion control part 13 is a portion for providing the measurement gas introduced from the buffer space 12 to the first inner space 20 of the predetermined diffusion resistance.

The first inner space 20 is provided as a space for adjusting the oxygen partial pressure in the measurement gas introduced through the second diffusion control part 13. The oxygen partial pressure is adjusted by an operation of a main pump cell 21.

The main pump cell 21 is an electrochemical pump cell constituted by the inner pump electrode 22 (22a, 22b) facing the first inner space 20, an external (out-of-inner-space) pump electrode 23 provided to be exposed to the outer space on the upper surface of the second solid electrolyte layer 6 (one main surface of the sensor element 703s), and the second solid electrolyte layer 6 sandwiched between the electrodes 22 and 23.

The inner pump electrode 22 is formed to have a rectangular shape in a plan view as a porous cermet electrode made of an Au—Pt alloy and $ZrO_2$.

In the meanwhile, the external pump electrode 23 is formed to have a rectangular shape in a plan view as a porous cermet electrode made of Pt or a Pt alloy and $ZrO_2$, for example.

In the main pump cell 21, a desired pump voltage Vp0 is applied between the inner pump electrode 22 and the external pump electrode 23 by a variable source 24, and a main pump current Ip0 is flowed between the inner pump electrode 22 and the external pump electrode 23 in a positive direction or a negative direction, thus oxygen in the first inner space 20 can be pumped out to the outer space or oxygen in the outer space can be pumped into the first inner space 20. The pump voltage Vp0 applied between the inner pump electrode 22 and the external pump electrode 23 in the main pump cell 21 is also referred to as the main pump voltage Vp0.

The inner pump electrode 22, the second solid electrolyte layer 6, the spacer layer 5, the first solid electrolyte layer 4, the third substrate layer 3, and the reference electrode 42 constitute an electrochemical sensor cell, namely a main sensor cell 80 to detect the oxygen concentration (oxygen partial pressure) in the atmosphere in the first inner space 20.

The oxygen concentration (oxygen partial pressure) in the first inner space 20 can be figured out by measuring an electromotive force V0 in the main sensor cell 80.

Furthermore, the controller 703c performs a feedback control on the main pump voltage Vp0 so that the electromotive force V0 is set to constant, thus the main pump current Ip0 is controlled. Accordingly, the oxygen concentration in the first inner space 20 is maintained to have a predetermined constant value.

The third diffusion control part 30 is a portion of providing the measurement gas, whose oxygen concentration (oxygen partial pressure) is controlled by operation of the main pump cell 21 in the first inner space 20, of a predetermined diffusion resistance, and guiding the measurement gas to the second inner space 40.

The second inner space 40 is provided as a space for performing processing according to the measurement of nitrogen oxide (NOx) in the measurement gas introduced through the third diffusion control part 30. The NOx concentration is measured mainly in the second inner space 40 where the oxygen concentration is adjusted by an auxiliary pump cell 50, by operation of a measurement pump cell 41.

The oxygen concentration (oxygen partial pressure) is previously adjusted in the first inner space 20, and subsequently, in the second inner space 40, the adjustment of the oxygen partial pressure is further performed by the auxiliary pump cell 50 on the measurement gas introduced through the third diffusion control part 30.

The auxiliary pump cell 50 is an auxiliary electrochemical pump cell constituted by an auxiliary pump electrode 51 (51a, 51b) provided to face the second inner space 40, the external pump electrode 23, and the second solid electrolyte layer 6.

The auxiliary pump electrode 51 is also formed to have a rectangular shape in a plan view as a porous cermet electrode made of an Au—Pt alloy and $ZrO_2$ in the manner similar to the inner pump electrode 22.

In the auxiliary pump cell 50, a desired pump voltage Vp1 is applied between the auxiliary pump electrode 51 and the external pump electrode 23 under control of the controller 703c, thus oxygen in the atmosphere in the second inner space 40 can be pumped out to the outer space or oxygen can be pumped from the outer space into the second inner space 40.

The auxiliary pump electrode 51, the reference electrode 42, the second solid electrolyte layer 6, the spacer layer 5, the first solid electrolyte layer 4, and the third substrate layer 3 constitute an electrochemical sensor cell, namely an auxiliary sensor cell 81 to control the oxygen partial pressure in the atmosphere in the second inner space 40.

The auxiliary pump cell 50 performs pumping with a variable source 52 on which a voltage control is performed based on an electromotive force V1 corresponding to the oxygen partial pressure in the second inner space 40 detected in the auxiliary sensor cell 81. Accordingly, the oxygen partial pressure in the atmosphere in the second inner space 40 is controlled so that it is low enough not to substantially influence the measurement of NOx.

In accordance with this, an auxiliary pump current Ip1 thereof is used for controlling the electromotive force of the main sensor cell 80. Specifically, the auxiliary pump current Ip1 is input, as a control signal, into the main sensor cell 80, and, through control of the electromotive force V0 thereof, the oxygen partial pressure in the measurement gas introduced through the third diffusion control part 30 into the second inner space 40 is controlled to have a gradient that is always constant. The oxygen concentration in the second inner space 40 is maintained to have a constant value of approximately 0.001 ppm by the functions of the main pump cell 21 and the auxiliary pump cell 50.

The measurement pump cell 41 measures the NOx concentration in the measurement gas in the second inner space 40. The measurement pump cell 41 is an electrochemical pump cell constituted by a measurement electrode 44 provided on the upper surface of the first solid electrolyte layer 4 facing the second inner space 40 in a position separated from the third diffusion control part 30, the external pump electrode 23, the second solid electrolyte layer 6, the spacer layer 5, and the first solid electrolyte layer 4.

The measurement electrode 44 is formed as a cermet electrode made of Pt or an alloy of Pt and $ZrO_2$. The measurement electrode 44 also functions as an NOx reduction catalyst for reducing NOx in the atmosphere in the second inner space 40. Furthermore, the measurement electrode 44 is covered with a fourth diffusion control part 45.

The fourth diffusion control part 45 is a film formed of a porous material mainly containing alumina ($Al_2O_3$). The fourth diffusion control part 45 has a function of limiting an amount of NOx flowing into the measurement electrode 44, and also functions as a protection film of the measurement electrode 44.

The measurement pump cell 41 can pump out oxygen generated by the resolution of NOx in the atmosphere around the measurement electrode 44 and detect a generation amount of oxygen as a pump current Ip2 under control of the controller 703c.

The second solid electrolyte layer 6, the spacer layer 5, the first solid electrolyte layer 4, the third substrate layer 3, the measurement electrode 44, and the reference electrode 42 constitute an electrochemical sensor cell, namely a measurement sensor cell 82 to detect the oxygen partial pressure around the measurement electrode 44. A variable source 46 is controlled based on an electromotive force V2, which corresponds to the oxygen partial pressure around the measurement electrode 44, detected in the measurement sensor cell 82.

The measurement gas introduced into the second inner space 40 reaches the measurement electrode 44 through the fourth diffusion control part 45 under a condition where the oxygen partial pressure is controlled. NOx in the measurement gas around the measurement electrode 44 is reduced ($2NO \rightarrow N_2 + O_2$), and oxygen is generated. The generated oxygen is pumped by the measurement pump cell 41. At this time, a voltage Vp2 of the variable source 46 is controlled so that the electromotive force V2 detected in the measurement sensor cell 82 is set to constant. Since the amount of oxygen generated around the measurement electrode 44 is proportional to the NOx concentration in the measurement gas, the NOx concentration in the measurement gas is calculated using the pump current Ip2 in the measurement pump cell 41. The pump current Ip2 is also referred to as the NOx current Ip2 hereinafter.

The second solid electrolyte layer 6, the spacer layer 5, the first solid electrolyte layer 4, the third substrate layer 3, the external pump electrode 23, and the reference electrode 42 constitute an electrochemical sensor cell 83, and the oxygen partial pressure in the measurement gas outside the sensor can be detected by an electromotive force Vref obtained by the sensor cell 83. The electromotive force Vref falls under a binary output in a conventional technique, thus the electromotive force Vref is also referred to as the binary output, and a value thereof is also referred to as a binary output value hereinafter.

The binary output value is provided to the NOx sensor output acquisition part 150 in the ECU 100 together with the NOx current Ip2 or the NOx sensor output value which is the NOx concentration calculated based on the NOx current Ip2. The binary output value increases as the oxygen concentration around the external pump electrode 23 gets smaller, and decreases as the oxygen concentration gets larger, thus the ECU 100 can grasp a change in the exhaust air between the rich state and the lean state by monitoring a change in the binary output value over time and detecting a change in the oxygen concentration.

The above configuration indicates that the NOx sensor 703 also has a function as a conventional binary sensor or A/F sensor.

The sensor element 703s further includes a heater part 70 having a function of adjusting a temperature for heating the sensor element 703s and keeping the temperature, in order to increase oxygen ion conductivity of the solid electrolyte constituting the base part.

In the heater part 70, power is supplied from a heater power source provided outside the sensor element 703s through a heater electrode 71, a through hole 73, and a heater lead 72a which are a power supply path to make a heater element (resistance heating element) 72 generate heat, thereby being capable of heating each part of the sensor element 703s and keeping each part to a predetermined temperature. The heater element 72 is formed of Pt or mainly of Pt. The heating processing increases the oxygen ion conductivity of the solid electrolyte constituting the base part in the sensor element 703s. The heating temperature at the time of heating by the heater element 72 in a case of using the NOx sensor 703 (in a case of driving the sensor element 703s) is referred to as a sensor element driving temperature.

In the NOx sensor 703 having such a configuration, oxygen contained in the measurement gas is pumped out through the operation of the main pump cell 21 and further of the auxiliary pump cell 50, and the measurement gas whose oxygen partial pressure is lowered enough not to substantially influence the measurement of NOx (for example, 0.0001 ppm to 1 ppm) reaches the measurement electrode 44. In the measurement electrode 44, NOx in the measurement gas which has reached the measurement electrode 44 is reduced, and oxygen is generated. The generated oxygen is pumped out by the measurement pump cell 41. The NOx current Ip2 flowing at the time of pumping out oxygen has a certain functional relationship with the concentration of NOx in the measurement gas (referred to as sensitivity characteristics hereinafter).

The sensitivity characteristics are previously specified using a plural types of model gas whose NOx concentrations are already known in advance of the actually use of the NOx sensor 703, and data thereof is stored in the controller 703c. In the actual use of the NOx sensor 703, signals indicating a value of the NOx current Ip2 flowing in accordance with the NOx concentration in the measurement gas is provided to the controller 703c from moment to moment. In the controller 703c, the NOx concentration is continuously calculated based on the value and the specified sensitivity characteristics and output to the NOx sensor output acquisition part 150 in the ECU 100 as the NOx sensor detection value. Accordingly, in the ECU 100, the NOx concentration in the measurement gas can be obtained almost in real time.

Also applicable is a configuration that the ECU 100 directly has the sensitivity characteristics in the memory, for example, and the value of the NOx current Ip2 measured in the NOx sensor 703 is directly output to the NOx sensor output acquisition part 150 as the NOx sensor detection value, and the value of the NOx current Ip2 acquired by the NOx sensor output acquisition part 150 is converted into the NOx concentration value.

<Control of Engine>

Descried next is control of an operation state of the engine 500 performed by the integral control part 140 in the vehicle 1000 according to the present embodiment. Described more specifically is active control of controlling the operation state of the engine 500 such that a control target value of upstream A/F changes between a set value AFa in a lean state and a set value AFb in a rich state in a stepped manner. In the active control, an exhaust gas temperature is set to a predetermined temperature at which the active control can be performed, in a range of 600° C. or higher (in an actual situation, a temperature margin of approximately 30° C. higher or lower than the above-mentioned temperature may be allowed). Note that, at least in the present circumstances, performing active control is difficult when an exhaust gas temperature exceeds 900° C. Thus, substantially, an upper limit value of an exhaust gas temperature is 900° C.

An operation state of the engine 500 with a control target value of upstream A/F being set to AFa is hereinafter referred to as a lean operation state, and an operation state of the engine 500 with a control target value of upstream A/F being set to AFb is referred to as a rich operation state. These operation states are achieved when the feedback control with a target value being set to AFa or AFb is performed in accordance with a control command by the integral control part 140. Specifically, these operation states are achieved when the fuel injection control part 120 controls the injection of the fuel from the fuel injection device 501 and the air-intake control part 130 controls the intake air from the air-intake unit 401, based on the detection result of the upstream A/F in the upstream air-fuel ratio detection means 701, which is acquired by the upstream air-fuel ratio acquisition part 110, and the target value AFa or AFb.

Firstly, while the engine 500 is controlled in the rich operation state, an amount of oxygen contained in an exhaust gas from the engine 500 is less than that in the stoichiometric state. Accordingly, in the TWC 601, oxygen that has been absorbed into ceria is released. Thus, the downstream A/F is kept in the lean state.

However, when oxygen is completely released from ceria, also the downstream side of the TWC 601 enters the rich state with less oxygen. In other words, the downstream A/F decreases. In the ECU 100, the decrease in the oxygen concentration on the downstream side due to the above state is detected by increase in the binary output value provided from the NOx sensor 703.

In the meanwhile, $NH_3$ is generated in the TWC 601 in rich operation. $NH_3$ is purified by reaction with oxygen while oxygen is absorbed in ceria, however, when oxygen is completely released from ceria and the downstream side enters the rich state, $NH_3$ flows out to the downstream side as it is.

In the present embodiment, the outflow of $NH_3$ according to the above configuration is detected as the change in the NOx sensor output value in the NOx sensor 703. This is a configuration of positively using so-called $NH_3$ interference of the NOx sensor 703 that a component caused by the resolution of $NH_3$ may be overlapped with the NOx current Ip2 because the resolution of not only NOx but also $NH_3$ may occur in the measurement electrode 44 in the NOx sensor 703.

Generally, in the case that the NOx sensor 703 targets NOx for the measurement in the measurement gas, in which NOx and $NH_3$ are co-existing, the $NH_3$ interference causes the reduction in the measurement accuracy of the NOx concentration. However, NOx is mostly purified in the TWC 601 in rich operation, thus even the NOx current Ip2 flows in the NOx sensor 703 nonetheless, the NOx sensor 703 having the $NH_3$ interference detects $NH_3$ flowing out from the TWC 601. This means that the $NH_3$ interference of the NOx sensor 703 is preferably utilized. Even in the case caused by the outflow of $NH_3$, the output value of the NOx sensor 703 derived from the pump current Ip2 is referred to as the NOx sensor output value for convenience.

As described above, when the state of the atmosphere on the downstream side of the TWC 601 is changed from the lean state to the rich state, the binary output value increases and the NOx sensor output value changes in the NOx sensor 703.

Then, in the vehicle 1000 according to the present embodiment, when the NOx sensor output acquisition part 150 detects any of the increase in the binary output value and the change in the NOx sensor output value, the operation state of the engine 500 is switched from the rich operation state to the lean operation state in accordance with control of each part by the integral control part 140. In other words, the operation state of the engine 500 is switched from the rich operation state to the lean operation state upon occurrence of one of the increase in the binary output value and the change in the NOx sensor output value first as a trigger.

Confirmed from an earnest review by the inventors of the present invention is that there is a difference in an order of the timing of the occurrence of the increase in the binary output value and the timing of the occurrence of the change in the NOx sensor output value in accordance with an amount of flow from the TWC 601. To give a brief description, there is a tendency that the change in the NOx sensor output value is detected first when the amount of flow is small, and the increase in the binary output value is detected first when the amount of flow is large.

However, in the vehicle 1000 according to the present embodiment, as described above, the operation state is switched at the timing of the occurrence of the increase or the change first, so that the deterioration of the emission from the TWC 601 to the downstream side caused by the continuous rich operation state is preferably suppressed regardless of the magnitude of the amount of flow of the exhaust air from the TWC 601.

In the meanwhile, excessive oxygen contained in an exhaust gas from the engine 500 is absorbed by ceria provided in the TWC 601 while the engine 500 is controlled in the lean operation state. Thus, the downstream A/F is kept in the rich state.

After that, when an oxygen absorption amount in ceria is saturated, oxygen contained in an exhaust gas is not absorbed by ceria but flows onto a downstream side of the TWC 601 as it is. That is to say, the downstream side of the TWC 601 is also in the lean state with excessive oxygen. In other words, the downstream A/F increases. In the ECU 100, the increase in the oxygen concentration on the downstream side due to the above state is detected by decrease in the binary output value provided from the NOx sensor 703.

In the meanwhile, NOx in the exhaust air of the engine is not purified in the TWC 601 but flows out to the downstream side as it is during lean operation. Such NOx is naturally detected by the NOx sensor 703. Thus, the NOx sensor output value changes at the timing when NOx flows out to the downstream side of the TWC 601.

As a result, when the state of the atmosphere on the downstream side of the TWC 601 is changed from the rich state to the lean state, the binary output value increases and the NOx sensor output value changes in the NOx sensor 703.

Then, in the vehicle 1000 according to the present embodiment, when the NOx sensor output acquisition part 150 detects any of the decrease in the binary output value and the change in the NOx sensor output value, the operation state of the engine 500 is switched from the lean operation state to the rich operation state in accordance with control of each part by the integral control part 140. In other words, the operation state of the engine 500 is switched from the lean operation state to the rich operation state upon occurrence of one of the decrease in the binary output value and the change in the NOx sensor output value first as a trigger.

Confirmed is that there is also a difference in the order of the timing of the occurrence of the decrease in the binary output value and timing of the occurrence of the change in the NOx sensor output value in accordance with an amount of flow from the TWC 601. To give a brief description, there is a tendency that the decrease in the binary output value is detected first when the amount of flow is small, and the change in the NOx sensor output value is detected first when the amount of flow is large.

However, in the vehicle 1000 according to the present embodiment, as described above, the operation state is switched at the timing of the occurrence of the decrease or the change first, thus the deterioration of the emission from the TWC 601 to the downstream side caused by the continuous lean operation state is also preferably suppressed regardless of the magnitude of the amount of flow of the exhaust air from the TWC 601.

That is to say, in the vehicle 1000 according to the present embodiment, both the switching from the rich operation state to the lean operation state and the switching from the lean operation state to the rich operation state are performed at the timing when the change in the binary output value from the NOx sensor 703 disposed on the downstream side of the TWC 601 or the change in the NOx sensor output value occurs first in the active control of the engine 500. Accordingly, the deterioration of the emission from the TWC 601 to the downstream side is preferably suppressed regardless of the magnitude of the amount of flow of the exhaust air from the TWC 601.

As described above, according to the present embodiment, the limited current type NOx sensor also capable of detecting the change in the surrounding oxygen concentration is disposed on the downstream side of the TWC in the exhaust path from the engine and the switching between the lean operation state and the rich operation state at the time of operating the engine under the active control is performed at the timing when the NOx sensor detects the change in the oxygen concentration or the change in the measurement pump current first, thus the deterioration of the emission from the TWC to the downstream side is preferably suppressed regardless of the amount of flow of the exhaust air from the TWC.

Modification Example

In the embodiment described above, the increase and decrease in oxygen on the downstream side of the TWC 601 is detected in accordance with the change in the binary output value, however, the current value of the main pump current Ip0 can be used as a substitute in the detection. This is because the magnitude of the main pump current Ip0 is determined in accordance with the amount of oxygen in the measurement gas introduced into the inside of the sensor element 703s.

Example

The active control was performed on the engine 500 so that the operation state was switched at the timing when the NOx sensor 703 detected the change in the binary output value or the change in the pump current first, and confirmed at that time was a relationship between the timing when the binary output value and the NOx sensor output value changed and the change in the amount of the exhaust air flow in the downstream of the TWC 601.

Specifically, a direct-injection four-cylinder turbo engine car with 2.0 L displacement was prepared as the vehicle 1000, and the vehicle 1000 was made to travel at speeds in three different levels using a chassis dynamometer to create conditions with different amounts of exhaust air flow in the downstream of the TWC 601, and a change in the binary output value and the NOx sensor output value over time in each case was confirmed. A value of an intake air mass flow sensor (MAF) substantially corresponding to the amount of exhaust air flow in the downstream of the TWC 601 was substituted for the value of exhaust air flow. The NOx concentration value was used as the NOx sensor output value.

Figure 3:
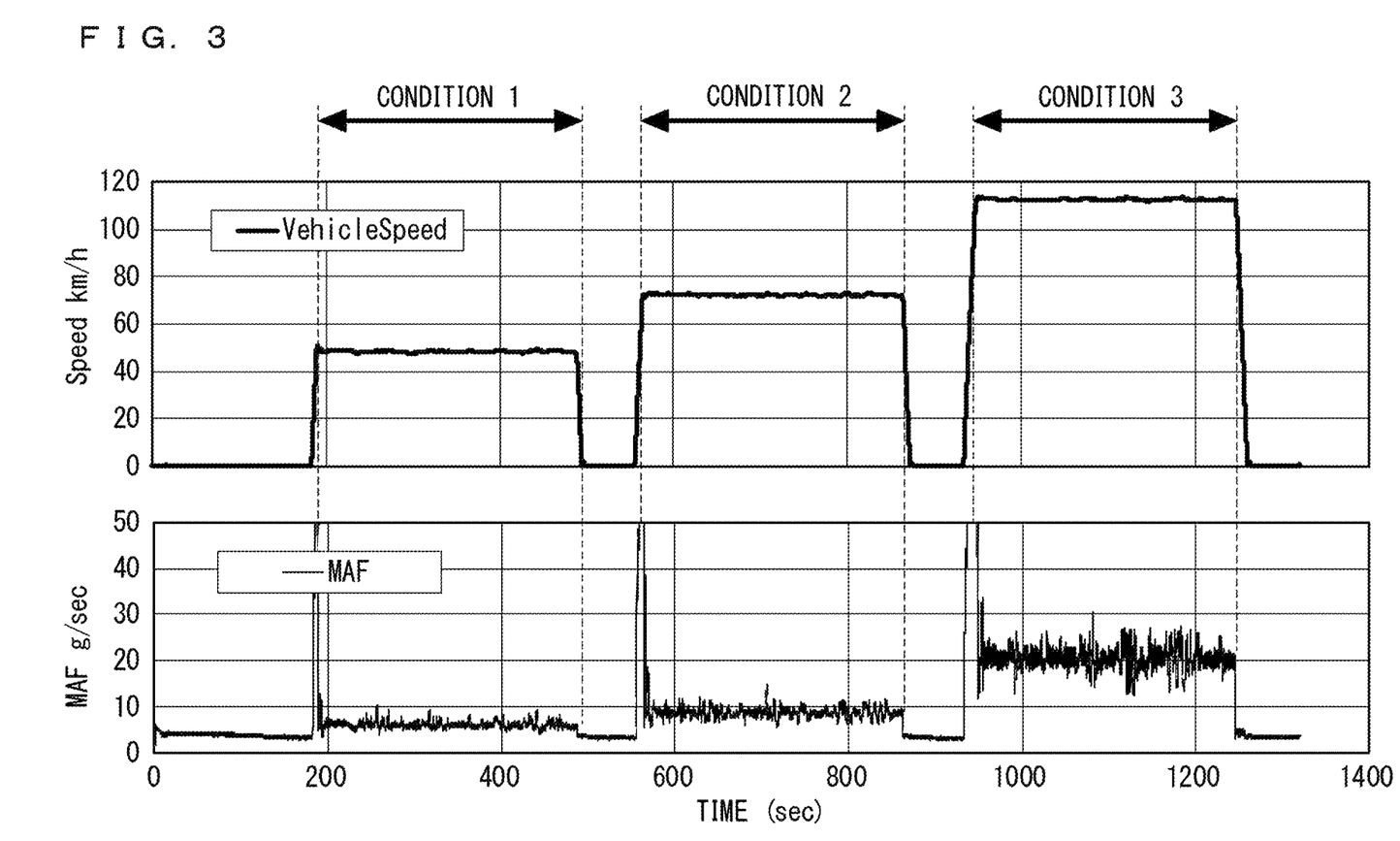
FIG. 3 is a drawing illustrating a travel speed of the vehicle and an elapsed time change of a value of an intake air MAF.

FIG. 3 is a drawing illustrating a travel speed of the vehicle 1000 and an elapsed time change of the value of the intake air MAF. As illustrated in FIG. 3, the travel speed of the vehicle 1000 is varied in three levels of 50 km/h (condition 1), 75 km/h (condition 2), and 112.5 km/h (condition 3). Values of the intake air MAF in each case were approximately 6 m/s (condition 1), approximately 9 m/s (condition 2), and approximately 20 m/s (condition 3), respectively.

Figure 4:
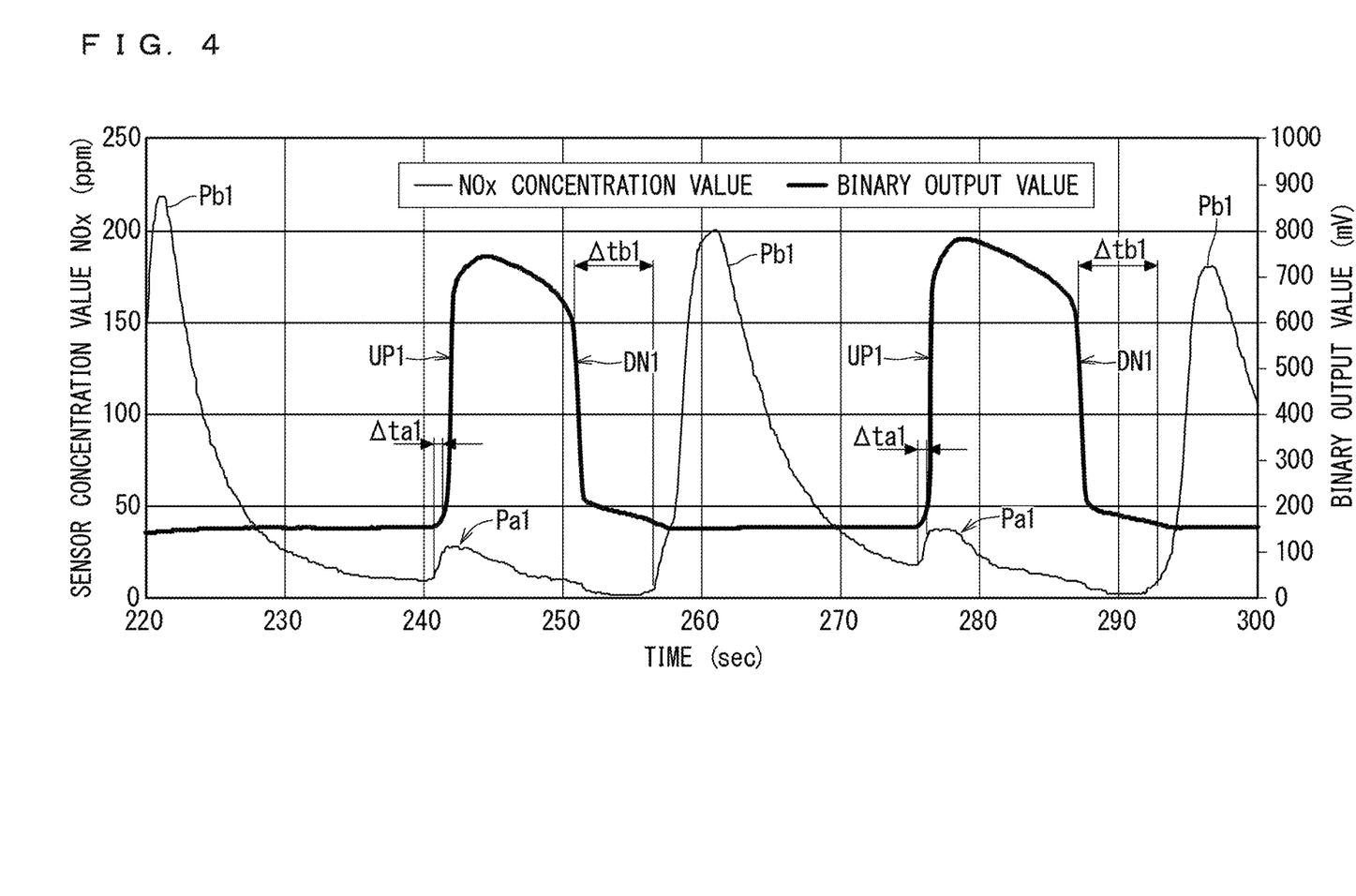
FIG. 4 is a drawing illustrating an elapsed time change of a binary output value and NOx concentration value under a condition 1.

FIG. 4 is a drawing illustrating part of an elapsed time change of the binary output value and the NOx concentration value under a condition 1 in FIG. 3. As illustrated in FIG. 4, a time when a value is substantially constant of approximately 150 mV and a time when a value is equal to or larger than 600 mV between a rapid increase UP1 and a rapid decrease DN1 appear alternately in a profile of the binary output value. In the meanwhile, a relatively small peak Pa1 and a relatively large peak Pb1 alternately appear in a profile of the NOx concentration value.

In the above case, the rapid increase UP1 occurring in the profile of the binary output value is caused by the state of the atmosphere on the downstream side of the TWC 601 changing from the rich state to the lean state. The peak Pa1 occurring in the profile of the NOx concentration value in tandem with the rapid increase UP1 is caused by the outflow of $NH_3$. The timing of the occurrence of the peak Pa1 is earlier than the timing of the occurrence of the rapid increase UP1 by a time difference $\Delta ta1$. Thus, in the condition 1, the operation state of the engine 500 was switched from the rich operation state to the lean operation state at a timing when the peak Pa1 started to occur in the profile of the NOx concentration value.

In the meanwhile, the rapid decrease DN1 occurring in the profile of the binary output value is caused by the state of the atmosphere on the downstream side of the TWC 601 changing from the lean state to the rich state. The peak Pb1 occurring in the profile of the NOx concentration value in tandem with the rapid decrease DN1 is caused by the outflow of NOx. The timing of the occurrence of the rapid decrease DN1 is earlier than the timing of the occurrence of the peak Pb1 by a time difference $\Delta tb1$. Thus, in the condition 1, the operation state of the engine 500 was switched from the lean operation state to the rich operation state at a timing when the rapid decrease DN1 occurred in the profile of the binary output value.

Figure 5:
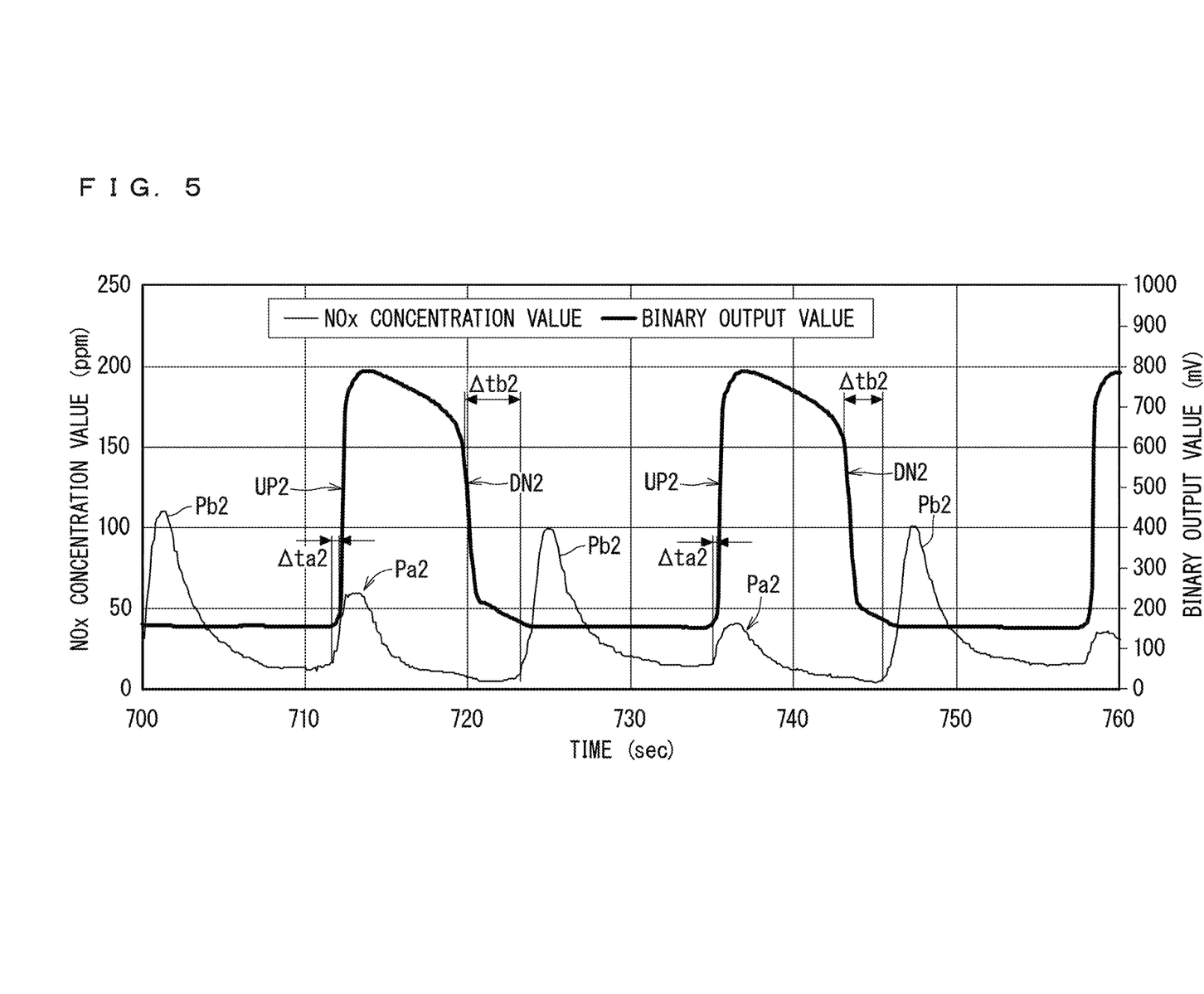
FIG. 5 is a drawing illustrating an elapsed time change of a binary output value and NOx concentration value under a condition 2.

FIG. 5 is a drawing illustrating part of an elapsed time change of the binary output value and the NOx concentration value under a condition 2 in FIG. 3. Also in a case in FIG. 5, a time when a value is substantially constant of approximately 150 mV and a time when a value is equal to or larger than 600 mV between a rapid increase UP2 and a rapid decrease DN2 appear alternately in a profile of the binary output value. A relatively small peak Pa2 and a relatively large peak Pb2 alternately appear in a profile of the NOx concentration value.

Meanings of the rapid increase UP2, the rapid decrease DN2, the peak Pa2, and the peak Pb2 are similar to those in the case of the condition 1 illustrated in FIG. 4. As can be seen from FIG. 5, the timing of the occurrence of the peak Pa2 is earlier than that of the rapid increase UP2 in the manner similar to the case in the condition, 1, however, a time difference $\Delta ta2$ tends to be equal to or slightly smaller than the time difference $\Delta ta1$ in the condition 1. In the meanwhile, the timing of the occurrence of the rapid decrease DN2 is earlier than that of the peak Pb2 in the manner similar to the case in the condition, 1, however, a time difference $\Delta tb2$ tends to be smaller than the time difference $\Delta tb1$ in the condition 1.

Thus, also in the condition 2, the operation state of the engine 500 was switched from the rich operation state to the lean operation state at a timing when the peak Pa2 started to occur in the profile of the NOx concentration value, and the operation state of the engine 500 was switched from the lean operation state to the rich operation state at a timing when the rapid decrease DN2 occurred in the profile of the binary output value.

Figure 6:
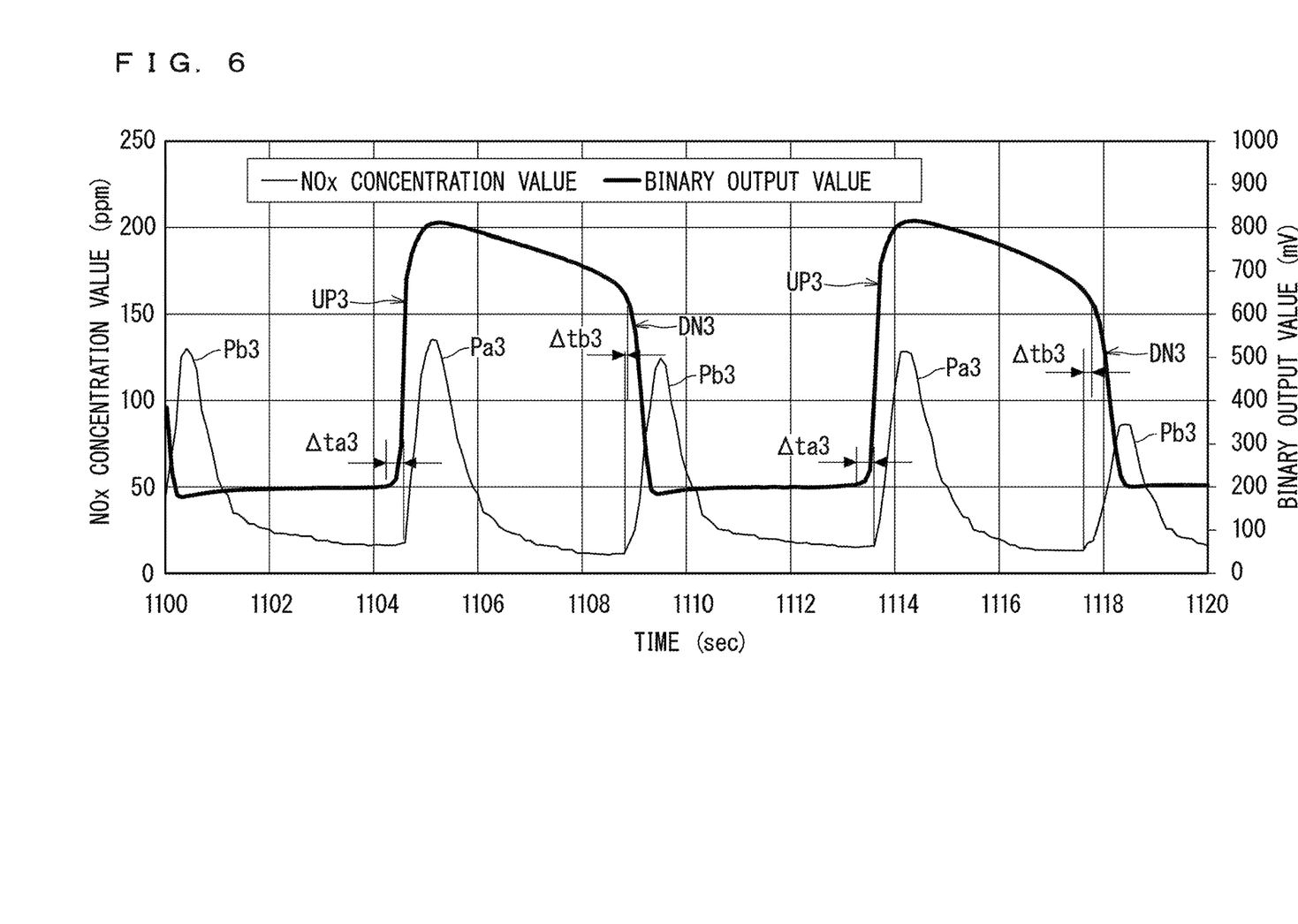
FIG. 6 is a drawing illustrating an elapsed time change of a binary output value and NOx concentration value under a condition 3.

FIG. 6 is a drawing illustrating part of an elapsed time change of the binary output value and the NOx concentration value under a condition 3 in FIG. 3. Also in a case in FIG. 6, a time when a value is substantially constant of approximately 200 mV and a time when a value is equal to or larger than 600 mV between a rapid increase UP3 and a rapid decrease DN3 appear alternately in a profile of the binary output value. Meanings of the rapid increase UP3 and the rapid decrease DN3 are similar to those in the case of the condition 1 illustrated in FIG. 4.

In the meanwhile, differing from FIG. 4 and FIG. 5, a relatively large peak Pa3 and a relatively small peak Pb2 alternately appear in a profile of the NOx concentration value, however, it is determined that the peak Pa3 is caused by the outflow of $NH_3$ and the peak Pb3 is caused by the outflow of NOx in accordance with a correspondence relationship between the binary output value and the profile.

In the condition 3 illustrated in FIG. 6, differing from the condition 1 and the condition 2, the timing of the occurrence of the increase UP3 is earlier than the timing of the occurrence of the peak Pa3 by a time difference Δta3. In the meanwhile, the timing of the occurrence of the peak Pb3 is substantially the same or earlier than the timing of the occurrence of the rapid decrease DN3 by a time difference Δtb3.

Thus, in the condition 3, the operation state of the engine 500 was switched from the rich operation state to the lean operation state at a timing when the rapid increase UP3 occurred in the profile of the binary output value, and the operation state of the engine 500 was switched from the lean operation state to the rich operation state at a timing when the peak Pb3 started to occur in the profile of the NOx concentration value.

The following tendencies are found out from the results illustrated in FIG. 4 to FIG. 6. There is the difference in the order of the timing of the occurrence of the change in the binary output value and the timing of the occurrence of the change in the NOx sensor output value, which is to be the trigger for the switching of the operation state of the engine 500 between the rich operation state and the lean operation state, in accordance with the magnitude of the amount of exhaust air flow in the downstream of the TWC 601, and in the switching from the rich operation state to the lean operation state, the change in the NOx sensor output value is detected earlier when the amount of flow is small, and the increase in the binary output value is detected earlier when the amount of flow is large. In the switching from the lean operation state to the rich operation state, the decrease in the binary output value is detected earlier when the amount of flow is small, and the change in the NOx sensor output value is detected earlier when the amount of flow is large.

While the invention has been shown and described in detail, the foregoing description is in all aspects illustrative and not restrictive. It is therefore understood that numerous modifications and variations can be devised without departing from the scope of the invention.

What is claimed is:

1. A method of performing active control between a lean operation state and a rich operation state on a vehicle engine including a three way catalyst in an exhaust path, comprising steps of:

a) locating, on a downstream side with respect to the three way catalyst in the exhaust path, a limited current type NOx sensor having NH3 interference and also capable of detecting a change in an oxygen concentration on the downstream side; and b) switching an operation state of the vehicle engine between a lean operation state and a rich operation state at a timing when a detection of a change in an oxygen concentration in an exhaust air flowing out from the three way catalyst or a detection of NOx or NH3 is performed first by the NOx sensor.

2. The method of controlling operation of the vehicle engine according to claim 1, wherein when the vehicle engine is in a rich operation state, the operation state of the vehicle engine is switched to a lean operation state at a timing when a detection of decrease in the oxygen concentration in the exhaust air or a detection of NH3 is performed first by the NOx sensor, and when the vehicle engine is in a lean operation state, the operation state of the vehicle engine is switched to a rich operation state at a timing when a detection of increase in the oxygen concentration in the exhaust air or a detection of NOx is performed first by the NOx sensor.

3. The method of controlling operation of the vehicle engine according to claim 1, wherein the NOx sensor includes a sensor element having a base part made up of an oxygen ion conductive solid electrolyte, the sensor element includes:
     a gas inlet through which the exhaust air is introduced from an outer space;
     a first inner space communicated with the gas inlet in a predetermined diffusion resistance;
     a main pump cell which is an electrochemical pump cell constituted by an inner pump electrode provided to face the first inner space, an out-of-space pump electrode provided to face a space other than the first inner space, and the solid electrolyte located between the inner pump electrode and the out-of-space pump electrode;
     a measurement electrode disposed in the sensor element and having at least one diffusion control part between the measurement electrode and the first inner space;
     a reference electrode provided in the sensor element to be able to have contact with a reference gas; and
     a measurement pump cell which is an electrochemical pump cell constituted by the measurement electrode, the out-of-space pump electrode, and the solid electrolyte located between the measurement electrode and the out-of-space pump electrode, and in the NOx sensor, the NOx or NH3 is detected when current flows in the measurement pump cell, and a change in an oxygen concentration of the exhaust air is detected based on a magnitude of an electromotive force occurring between the out-of-space pump electrode and the reference electrode, decreasing with increase in an oxygen concentration around the out-of-space pump electrode, and increasing with decrease in an oxygen concentration around the out-of-space pump electrode.

4. A vehicle system including a three way catalyst in an exhaust path of an engine, comprising:

an operation control element configured and disposed to be able to perform active control between a lean drive state and a rich drive state on the engine; and a limited current type NOx sensor located on a downstream side with respect to the three way catalyst in the exhaust path, having NH3 interference and also capable of detecting a change in an oxygen concentration on the downstream side, wherein the operation control element switches an operation state of the engine between a lean operation state and a rich operation state at a timing when the NOx sensor performs a detection of a change in an oxygen concentration in an exhaust air flowing out from the three way catalyst or a detection of NOx or NH3 first.

5. The vehicle system according to claim 4, wherein the operation control element performs:

when the engine is in a rich operation state, switching the operation state of the engine to a lean operation state at a timing when a detection of decrease in the oxygen concentration in the exhaust air or a detection of NH3 is performed first by the NOx sensor; and when the engine is in a lean operation state, switching the operation state of the engine to a rich operation state at a timing when a detection of increase in the oxygen concentration in the exhaust air or a detection of NOx is performed first by the NOx sensor.

6. The vehicle system according to claim 4, wherein the NOx sensor includes a sensor element having a base part made up of an oxygen ion conductive solid electrolyte, the sensor element includes:

a gas inlet through which the exhaust air is introduced from an outer space;

a first inner space communicated with the gas inlet in a predetermined diffusion resistance;

a main pump cell which is an electrochemical pump cell constituted by an inner pump electrode provided to face the first inner space, an out-of-space pump electrode provided to face a space other than the first inner space, and the solid electrolyte located between the inner pump electrode and the out-of-space pump electrode;

a measurement electrode disposed in the sensor element and having at least one diffusion control part between the measurement electrode and the first inner space;

a reference electrode provided in the sensor element to be able to have contact with a reference gas; and a measurement pump cell which is an electrochemical pump cell constituted by the measurement electrode, the out-of-space pump electrode, and the solid electrolyte located between the measurement electrode and the out-of-space pump electrode, and in the NOx sensor, the NOx or NH3 is detected when current flows in the measurement pump cell, and a change in an oxygen concentration of the exhaust air is detected based on a magnitude of an electromotive force occurring between the out-of-space pump electrode and the reference electrode, decreasing with increase in an oxygen concentration around the out-of-space pump electrode, and increasing with decrease in an oxygen concentration around the out-of-space pump electrode.

7. The method of controlling operation of the vehicle engine according to claim 2, wherein the NOx sensor includes a sensor element having a base part made up of an oxygen ion conductive solid electrolyte, the sensor element includes:

a gas inlet through which the exhaust air is introduced from an outer space;

a first inner space communicated with the gas inlet in a predetermined diffusion resistance;

a main pump cell which is an electrochemical pump cell constituted by an inner pump electrode provided to face the first inner space, an out-of-space pump electrode provided to face a space other than the first inner space, and the solid electrolyte located between the inner pump electrode and the out-of-space pump electrode;

a measurement electrode disposed in the sensor element and having at least one diffusion control part between the measurement electrode and the first inner space;

a reference electrode provided in the sensor element to be able to have contact with a reference gas; and a measurement pump cell which is an electrochemical pump cell constituted by the measurement electrode, the out-of-space pump electrode, and the solid electrolyte located between the measurement electrode and the out-of-space pump electrode, and in the NOx sensor, the NOx or NH3 is detected when current flows in the measurement pump cell, and a change in an oxygen concentration of the exhaust air is detected based on a magnitude of an electromotive force occurring between the out-of-space pump electrode and the reference electrode, decreasing with increase in an oxygen concentration around the out-of-space pump electrode, and increasing with decrease in an oxygen concentration around the out-of-space pump electrode.

8. The vehicle system according to claim 5, wherein the NOx sensor includes a sensor element having a base part made up of an oxygen ion conductive solid electrolyte, the sensor element includes:

a gas inlet through which the exhaust air is introduced from an outer space;

a first inner space communicated with the gas inlet in a predetermined diffusion resistance;

a main pump cell which is an electrochemical pump cell constituted by an inner pump electrode provided to face the first inner space, an out-of-space pump electrode provided to face a space other than the first inner space, and the solid electrolyte located between the inner pump electrode and the out-of-space pump electrode;

a measurement electrode disposed in the sensor element and having at least one diffusion control part between the measurement electrode and the first inner space;

a reference electrode provided in the sensor element to be able to have contact with a reference gas; and a measurement pump cell which is an electrochemical pump cell constituted by the measurement electrode, the out-of-space pump electrode, and the solid electrolyte located between the measurement electrode and the out-of-space pump electrode, and in the NOx sensor, the NOx or NH3 is detected when current flows in the measurement pump cell, and a change in an oxygen concentration of the exhaust air is detected based on a magnitude of an electromotive force occurring between the out-of-space pump electrode and the reference electrode, decreasing with increase in an oxygen concentration around the out-of-space pump electrode, and increasing with decrease in an oxygen concentration around the out-of-space pump electrode.

* * * * *